US012400195B2

(12) United States Patent
Mathew et al.

(10) Patent No.: US 12,400,195 B2
(45) Date of Patent: *Aug. 26, 2025

(54) SYSTEM AND METHOD FOR TRANSACTION SETTLEMENT

(71) Applicant: Visa International Service Association, San Francisco, CA (US)

(72) Inventors: Sachin Cherian Mathew, Singapore (SG); Krishna Nellutla, Singapore (SG); Thai Binh Do Nguyen, Singapore (SG); Venkata Ramaiah Bhemineni, Singapore (SG); Dong Soon Denis Kang, Seoul (KR)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,235

(22) Filed: Jul. 24, 2023

(65) Prior Publication Data
US 2023/0368159 A1    Nov. 16, 2023

Related U.S. Application Data

(63) Continuation of application No. 16/682,451, filed on Nov. 13, 2019, now Pat. No. 11,710,107.

(51) Int. Cl.
G06Q 20/00    (2012.01)
G06Q 20/06    (2012.01)
G06Q 20/36    (2012.01)

(52) U.S. Cl.
CPC ......... *G06Q 20/065* (2013.01); *G06Q 20/367* (2013.01)

(58) Field of Classification Search
CPC .................................................... G06Q 20/065
(Continued)

(56) References Cited

U.S. PATENT DOCUMENTS 9,747,586 B1    8/2017  Frolov et al.
9,892,460 B1    2/2018  Winklevoss et al.
(Continued)

FOREIGN PATENT DOCUMENTS

JP    2012517060 A    7/2012
JP    2018507501 A    3/2018
(Continued)

OTHER PUBLICATIONS

Authors: Vijak Sethaput et al; Title: Blockchain Application for Central Bank Digital Currencies (CBDC); Publisher: IEEE; Date Added to IEEE Xplore: Dec. 30, 2021. (Year: 2021).*
(Continued)

*Primary Examiner* — Bruce I Ebersman
*Assistant Examiner* — Hatem M Ali
(74) *Attorney, Agent, or Firm* — K&L Gates LLP

(57) ABSTRACT

Cryptocurrencies may be used within the current Four Party Model to settle transactions between a merchant and a consumer who may use or accept fiat and/or cryptocurrency. An intermediary wallet entity may assume the risk of cryptocurrency transactions. For example, a fiat-fiat transaction may follow the usual settlement process of the Four Party Model. In a crypto-crypto transaction, settlement may occur in real time. But in a fiat merchant/crypto customer transaction, settlement may be made from the customer's crypto wallet to an intermediary wallet. Fiat settlement would then occur between the intermediary and merchant following the Four Party Model. In a crypto merchant/fiat customer transaction, a transfer may be made from the intermediary wallet to the merchant's crypto wallet. Fiat settlement between the customer's bank (issuer) and intermediary can happen in the usual settlement process.

16 Claims, 9 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2012/0209762 A1 | 8/2012 | Metaireau et al. | |
| 2012/0310824 A1 | 12/2012 | Liberty | |
| 2016/0260169 A1 | 9/2016 | Arnold et al. | |
| 2017/0048209 A1 | 2/2017 | Lohe et al. | |
| 2019/0034888 A1 | 1/2019 | Grassadonia et al. | |
| 2019/0139033 A1* | 5/2019 | Ricotta | G06Q 20/1085 |
| 2019/0378128 A1* | 12/2019 | Moore | H04L 9/3239 |

FOREIGN PATENT DOCUMENTS

| | | | |
|---|---|---|---|
| JP | 2018077642 A | 5/2018 |
| JP | 2018137005 A | 8/2018 |
| WO | 2019067801 A1 | 4/2019 |
| WO | 2019106659 A1 | 6/2019 |
| WO | 2019123676 A1 | 6/2019 |

OTHER PUBLICATIONS

Authors: Mohammad Babiul Islam et al; Title: Cryptocurrency vs. Fiat Currency: Architecture, Algorithm, Cashflow & Ledger Technology on Emerging Economy: The Influential Facts of Cryptocurrency and Fiat Currency; Publisher: IEEE; Date Added to IEEE Xplore: Dec. 9, 2018. (Year: 2018).*
Valente et al., Can Bitcoin Be the Future of Digital Payments? https://www.proquest.com/docview/2131158523/E18D1E3CC4F84F16PQ/3?accountid = 14 7 53 (Year: 2018).
Zelic et al., Cryptocurrency: General Challenges of Legal Regulation and the Swiss Model of Regulation, https://www.proquest.com/docview/2131162965/E 18 D 1 E3CC4F84F 16 PQ/4 ?accountid = 14 7 53 (Year: 2018).
Zornic et al., Forecasting Cryptocurrency Investment Return Using Time Series and Monte Carlo Simulation (Year: 2018).
Dostov et al., Scholarly Journal: Cryptocurrencies: an unconventional challenge to the AML/CFT regulators? London vol. 21, Iss. 3, (2014): 249-263. DOI:10.1108/JFC-06-2013-0043 ( Year: 2014).
Morris, Thesis: Anonymity Analysis of Cryptocurrencies: Rochester Institute of Technology. ProQuest Dissertations Publishing, 2015. 1586752. (Year: 2015).
Extended European Search Report issued in App. No. EP20886966. 9, dated Nov. 15, 2022, 8 pages.

* cited by examiner

SYSTEM AND METHOD FOR TRANSACTION SETTLEMENT

CROSS-REFERENCE TO RELATED APPLICATION

This application is a continuation application claiming priority under 35 U.S.C. § 120 to U.S. patent application Ser. No. 16/682,451, entitled SYSTEM AND METHOD FOR TRANSACTION SETTLEMENT, filed Nov. 13, 2019, the entire disclosure of which is hereby incorporated by reference herein.

BACKGROUND

The "Four Party Model" describes the credit card business model consisting of card networks, issuing banks ("issuers"), cardholders or consumers, merchants, and acquirer. The model relies on the use of "fiat" currency that has no intrinsic value, but is backed by a government that issues it to consumers. Fiat currency has value only because a government maintains its value or because parties engaging in exchange agree on its value. Virtually all electronic card payments use fiat currency and are constructed on the back of the Four Party Model and ISO 8583 as these define a message format and a communication flow so that different systems can exchange transaction requests and responses to keep the entire system working together. The consumer receives a payment card account from the issuer. The account could be a credit, debit, or prepaid type of account linked to a payment device. The account can operate via a number of different methods including the Internet, a physical card, or mobile devices.

A typical transaction occurs in three phases: authorization, clearing, and settlement. During authorization, a cardholder or consumer chooses goods and services they wish to purchase using the payment device linked to an issuer account. The merchant's acquirer bank receives the transaction from the merchant and contacts the card network (e.g., Diner's Club, Discover, etc.) to check card security features and sends the transaction to the cardholder's bank for approval. The issuer approves the transaction as well as the card network and replies to the merchant's bank. The merchant's bank sends approval to the merchant, and the cardholder completes the transaction and receives a receipt. During clearing, the merchant's bank sends a clearing message including the purchase information to the card network which validates the purchase information and sends the purchase information to the cardholder's bank. The clearing process reconciles the merchant's bank and cardholder's bank for the transaction. At settlement, the cardholder's bank sends payment to the card network, and the card network sends the payment to the merchant's bank. The merchants bank then pays the merchant, and the cardholder's bank bills the cardholder.

Cryptocurrency has emerged as an alternative to fiat currency. Cryptocurrency is a completely digital medium of exchange that uses strong cryptography to secure financial transactions, control the creation of additional units, and verify the transfer of assets. Cryptocurrencies use decentralized control as opposed to centralized digital currency and central banking systems. Decentralized control is achieved by distributed ledger technology, such as a blockchain, that serves as a public financial transaction database.

There are currently thousands of different types of cryptocurrencies. However, these cryptocurrencies are not easily integrated into the Four Party Model that relies on fiat currency and integration with central banking systems. Without integration into the Four Party Model or updating the Model to accept cryptocurrencies, merchants will be reluctant to accept to accept this form of payment in lieu of fiat currency.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The present disclosure provides a technical solution to the technical problem of facilitating the use of cryptocurrencies within the Four Party Model between a merchant and a consumer who may use or accept fiat and/or cryptocurrency. In some embodiments, an intermediary wallet entity may assume the risk of cryptocurrency transactions. For example, a fiat-fiat transaction may follow the usual settlement process of the Four Party Model. In a crypto-crypto transaction, settlement may occur in real time. But in a fiat merchant/crypto customer transaction, settlement may be made from the customer's crypto wallet to an intermediary wallet. Fiat settlement would then occur between the intermediary and merchant following the Four Party Model. In a crypto merchant/fiat customer transaction, a transfer is made from the intermediary wallet to the merchant's crypto wallet. Fiat settlement between the customer's bank (issuer) and intermediary can happen in the usual settlement process.

In further embodiments, a computer-implemented method or a system including a processor and processor-executable instructions stored in a memory may settle a transaction within the Four Party Model when selectively using fiat currency or crypto currency. When executed by the system or implemented in the method, the embodiments may receive a transaction request for a transaction between a user computer system and a merchant computer system. The transaction request may indicate a first currency for the user computer system and a second currency for the merchant computer system. The first currency and the second currency are one of a fiat currency or a crypto currency. The embodiments may then, in response to the first currency being the fiat currency and the second currency being the crypto currency, send an authorization request to a payment device issuer system, transfer a settlement amount of the fiat currency from the user computer system to an intermediate cryptocurrency wallet module; and transfer the settlement amount in crypto currency from the intermediate cryptocurrency wallet module to the merchant computer system. In response to the first currency being the crypto currency and the second currency being the fiat currency, the embodiments may send a validation request to a validation network for the crypto currency, compare a set of user crypto currency rules to a set of merchant crypto currency rules, and, in response to the set of user crypto currency rules matching the set of merchant crypto currency rules, transfer the settlement amount of the crypto currency from the user computer system to an intermediate cryptocurrency wallet module. The embodiments, may then transfer the settlement amount in fiat currency from the intermediate cryptocurrency wallet module to the merchant computer system.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

Specification

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
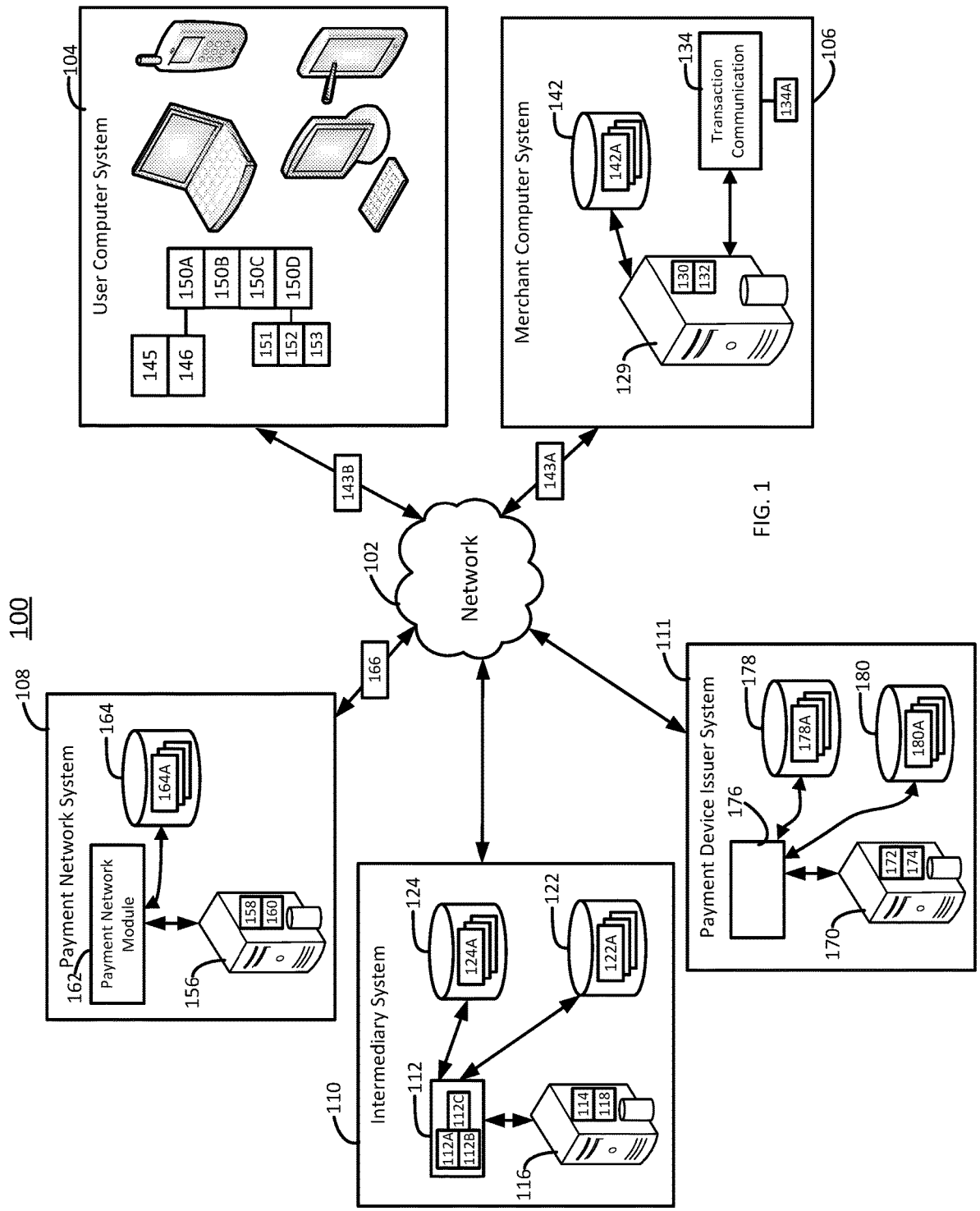
FIG. 1 shows an illustration of an exemplary payment system for integrating cryptocurrency validation into the Four Party Model.

FIG. 1 generally illustrates one embodiment of a payment system 100 for integrating cryptocurrencies into the Four Party Model. The system 100 may include a computer network 102 that links one or more systems and computer components. In some embodiments, the system 100 includes a user computer system 104, a merchant computer system 106, a payment network system 108, an intermediary system 110, and a payment device issuer system 111.

The network 102 may be described variously as a communication link, computer network, internet connection, etc. The system 100 may include various software or computer-executable instructions or components stored on tangible memories and specialized hardware components or modules that employ the software and instructions to facilitate transactions using cryptocurrencies within the "Four Party Model," as described herein.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A user computer system 104 may include a processor 145 and memory 146. The user computing system 104 may include a server, a mobile computing device, a smartphone, a tablet computer, a Wi-Fi-enabled device or other personal computing device capable of wireless or wired communication, a thin client, or other known type of computing device. The memory 146 may include various modules including instructions that, when executed by the processor 145 control the functions of the user computer system generally and integrate the user computer system 104 into the system 100 in particular. For example, some modules may include an operating system 150A, a browser module 150B, a communication module 150C, and a cryptocurrency wallet module 150D. In some embodiments, the cryptocurrency wallet module 150D and its functions described herein may be incorporated as one or more modules of the user computer system 104. In other embodiments, the module 150D and its functions described herein may include fiat currency and/or cryptocurrency functions and may be incorporated as one or more sub-modules of the payment network system 110. The cryptocurrency wallet module 150D may include instructions to store public and private keys for a user's cryptocurrency and interface with various blockchain to monitor balance, send money, and conduct transactions.

The merchant computer system 106 may include a computing device such as a merchant server 129 including a processor 130 and memory 132 including components to facilitate transactions with the user computer system 104 and/or a payment device 200 (FIG. 2) via other entities of the system 100. In some embodiments, the memory 132 may include a transaction communication module 134. The transaction communication module 134 may include instructions to send merchant messages 134A to other entities (i.e., 104, 108, 110, 111) of the system 100 to indicate a transaction has been initiated with the user computer system 104 and/or payment device 200 including cryptocurrency data, payment device data, and other data as herein described. The merchant computer system 106 may also include a transaction repository 142 and instructions to store payment and other transaction data 142A within the transaction repository 142. In some embodiments, the merchant computer system 106 may send payment data 143A corresponding to a payment device 200 (FIG. 2) and/or a cryptocurrency wallet module 150D to the payment network system 108 or other entities of the system 100, or receive payment data from the user computer system 104 in a cryptocurrency wallet-based or other computer-based transaction between the user computer system 104 and the merchant computer system 106.

The payment network system 108 may include a payment server 156 including a processor 158 and memory 160. The memory 160 may include a payment network module 162 including instructions to facilitate payment between parties (e.g., one or more users, merchants, etc.) using the payment system 100. The module 162 may be communicably connected to an account holder data repository 164 including payment network account data 164A. The payment network account data 164A may include any data to facilitate payment and other cryptocurrency and funds transfers between system entities (i.e., 104, 106, 110, and 111). For example, the payment network account data 164A may include identification data, account history data, payment device data, etc. The module 162 may also include instructions to send payment messages 166 to other entities and components of the system 100 in order to complete transactions between users and/or merchants.

The intermediary system 110 may include one or more instruction modules including a cryptocurrency module 112 that, generally, may include instructions to cause a processor 114 of an intermediary server 116 to functionally communicate with a plurality of other computer-executable steps or sub-modules, e.g., sub-modules 112A, 112B, 112C, 112D and components of the system 100 via the network 102 to facilitate cryptocurrency transactions. These modules 112A, 112B, 112C, and 112D may include instructions that, upon loading into the server memory 118 and execution by one or more computer processors 114, facilitate the use of cryptocurrency or fiat currency for payment transactions between various users and/or merchants that may be processed by the payment network system 108, manage the risk of a cryptocurrency transaction, and have one or more wallets for different types of cryptocurrencies. For example, sub-modules may include an intermediate cryptocurrency wallet module 112A, a rules module 112B, a transfer module 112C, an interface module 112D, etc. A first data repository 122 may store user profiles 122A that each include rules for all user computer systems 104 that include a cryptocurrency wallet module 150D. For example, the user profile 122A may include cryptocurrency wallet data for all the currencies a user wants to use in various transactions, an authorization for the intermediary system to transfer funds from the cryptocurrency wallet 150D, Know Your Customer (KYC), Anti-Money Laundering (AML), and Combating the Financing of Terrorism (CFT) rules for each user and merchant, etc. In some embodiments, further data repositories may correspond to different types of payment network transaction data 122A or sub-components of the payment network transaction data 122A (e.g., a merchant, an account holder, a transaction region, transaction type, a time of day, a merchant and/or customer type, a payment device type, a transaction amount, cardholder name, cardholder account number, type of cryptocurrency, and other payment network account data 164A, etc.). A merchant computer system 106 may enroll with an acquirer or an acquirer processor to indicate the availability of cryptocurrency transactions with that merchant. For example, a merchant computer system 106 may register with an acquirer the different types of cryptocurrencies the merchant will accept and provide merchant wallet data to facilitate settlement of a cryptocurrency transaction. In some embodiments, a second data repository 124 may include merchant registration data as well as the acquirer data and the merchant wallet data. Other data may be received and/or derived by the intermediary system 110 and stored in the second data repository 124 and used by the system 100 as described herein. For example, the second data repository may be used to store validation data 124A from a cryptocurrency wallet system or other method of electronic or computer-based payment. Validation data 124A may include node information for the P2P computers that are part of each validation network that supports each type of cryptocurrency. For example, depending on the network parameters for the particular type of cryptocurrency used in the transaction, the transaction is either verified instantly or transcribed into a secured record and placed in a queue of pending transactions. In this case, nodes determine if the transactions are valid based on a set of rules (e.g., rules shown in FIGS. 5B and 5C).

Figure 2A:
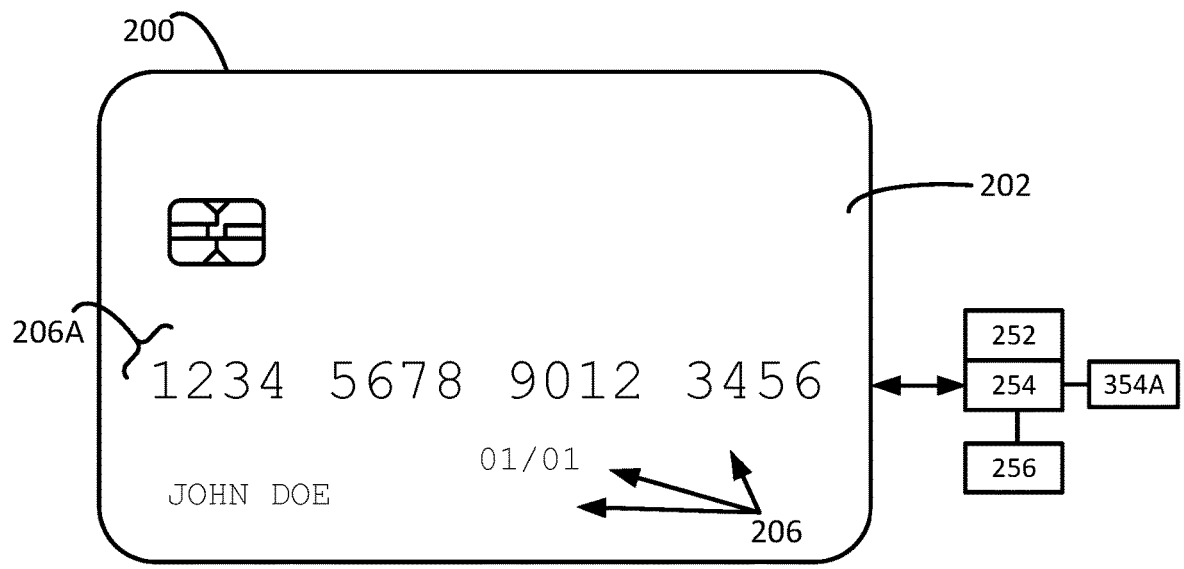
FIGS. 2A and 2B show views of an exemplary payment device.
Figure 2B:
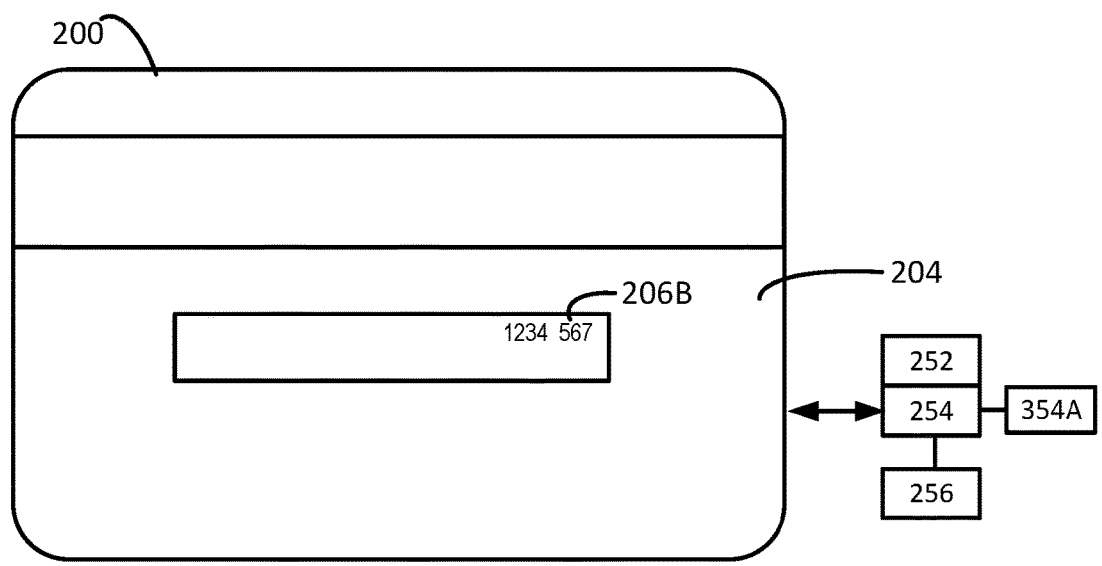

With brief reference to FIGS. 2A and 2B, an exemplary payment device 200 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet (e.g., fiat currency and/or cryptocurrency such as the cryptocurrency wallet module 150D) where an account from a plurality of accounts previously stored in the wallet (e.g., cryptocurrency public keys 151 and cryptocurrency private keys 152, interfaces for various blockchain 153, etc.) is selected and communicated to the system 100 to execute the transaction. As long as the payment device 200 is able to communicate securely with the system 100 and its components, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as payment network account data 164A for the account holder. A memory 254 generally and a module 254A in particular may be encrypted such that all data related to payment is secure from unwanted third parties. A communication interface 256 may include instructions to facilitate sending payment data 143B, 143A such as a payment payload, a payment token, or other data to identify payment information to one or more components of the system 100 via the network 102.

A payment device issuer system 111 may also include a payment device issuer server 170 including a processor 172 and memory 174. The memory may include a payment device issuer module 176 including instructions to facilitate payment to the merchant computer system 106 using the payment system 100. The module 176 may be communicably connected to an issuer transaction data repository 178 including issuer transaction data 178A. The issuer transaction data 178A may include data to facilitate payment and other funds transfers to/from the merchant from the payment device issuer system 111. For example, the issuer transaction data 178A may include merchant identification data, user account history data, payment device data, etc. The module 176 may also be communicably connected to a cardholder account data repository 180 including cardholder account data 180A. The module 162 may also include instructions to receive payment messages 166 from the payment network system 108 in order to complete transactions between users and/or merchants and better manage user and merchant funds account balances to complete cryptocurrency transactions.

Figure 3:
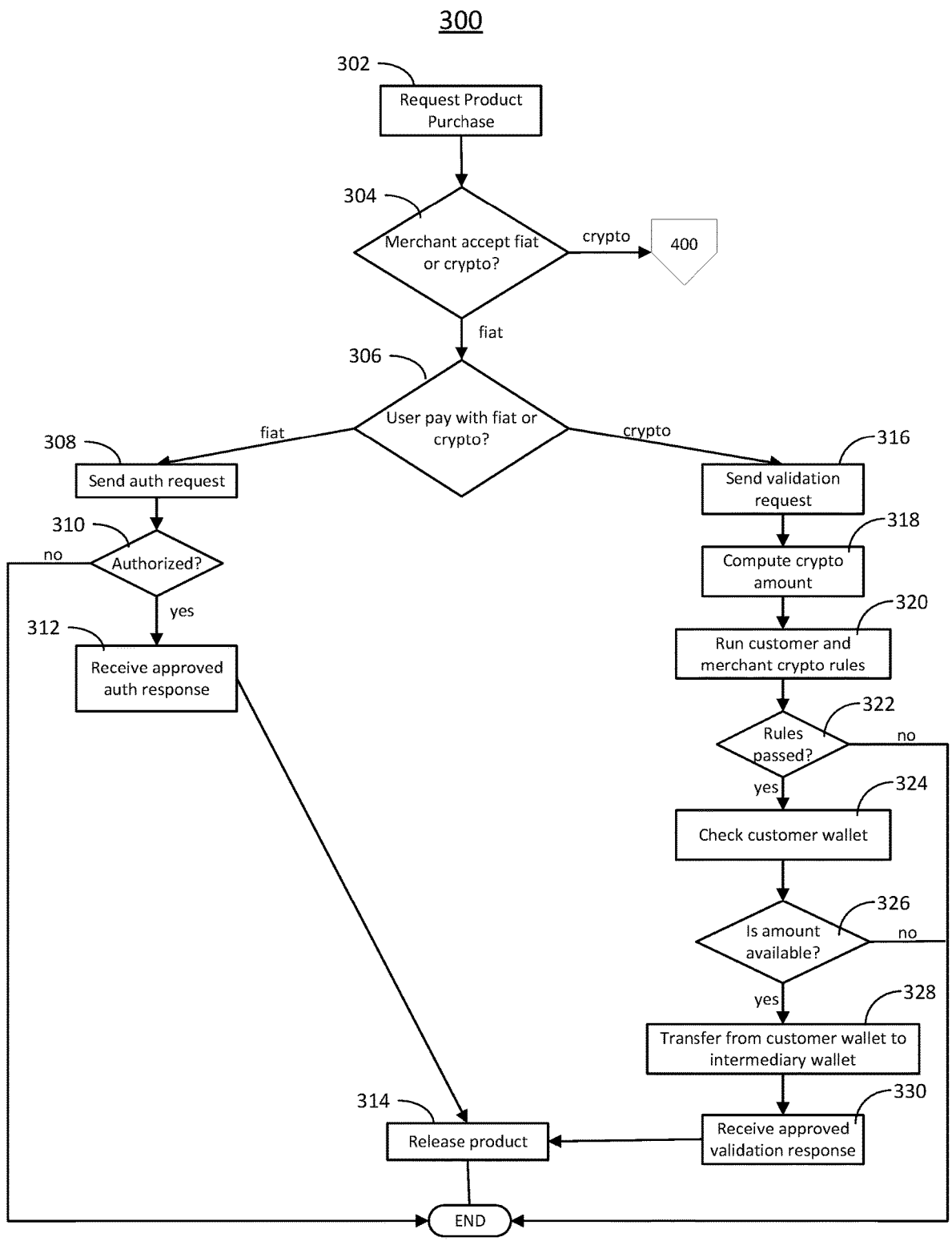
FIG. 3 is a flowchart of a method for integrating cryptocurrency in the Four Party Model when the merchant accepts cryptocurrency.

FIG. 3 is a flowchart of a method 300 for integrating cryptocurrency in the Four Party Model when the merchant accepts fiat currency and the user has a choice to pay with either fiat or crypto currency via the system. Each step of the method 300 may be performed on a server or other computing device which may be physically configured to execute the different aspects of the method. Each step of the method 300 is one or more computer-executable instructions (e.g., modules, blocks, stand-alone instructions, etc.) performed on a processor (e.g., 114, 130, 145, 158, 172, 902, etc.) of a server or other computing device (e.g., a payment network system 108, a user computer system 104, a merchant computer system 106, an intermediary system 110, a payment device issuer system 111, or other computer system) which may be physically configured to execute the different aspects of the method 300. Each step may include execution of any of the instructions as described in relation to the systems or other components that are internal or external to the systems. While the below blocks are presented as an ordered set, the various steps described may be executed in any particular order to complete the methods described herein.

At block 302, the system 100 may cause a processor to execute instructions stored in a computer memory to receive a transaction request. In some embodiments, the transaction request may be from a user computer system 104 to a merchant computer system 106 to purchase a product from the merchant. The request may be sent by the user computer system 104 generally or the communication module 150C in particular to the merchant computer system 106 and the transaction communication module 134 in particular.

At block 304, the system 100 may cause a processor to execute instructions stored in a computer memory to determine whether the merchant computer system 106 accepts fiat or crypto currency. If fiat, the method 300 may proceed to block 306 and the system 100 may cause a processor to execute instructions stored in a computer memory to determine a currency selection from the product purchase request.

If, at block 306, the method 300 determines that the user has selected fiat currency to complete the payment transaction with the merchant, then, at block 308, the method 300 may cause a processor to execute instructions stored in a computer memory to send an authorization request. In some embodiments, the user computer system may cause a processor to execute instructions stored in a computer memory to send the authorization request to one or more of the merchant 106, the payment network system 108, an acquirer of the merchant computer system 106 (e.g., a computing system of bank or financial institution that processes payments on behalf of the merchant computer system 106), etc.

At block 310, the system 100 may cause a processor to execute instructions stored in a computer memory to determine whether the transaction is authorized by the user computer system 104. In some embodiments, the payment device issuer module 176 may receive instructions to determine if the user computer system 104 has authorized the transaction indicated by the product purchase request of block 302. If the user computer system 104 has not authorized the transaction, then the method 300 may end. If the user computer system 104 has authorized the transaction, then one or more entities of the system 100 (e.g., the merchant computer system 106, the payment network system 108, etc.) may receive an approved authorization response indicating that the merchant has received payment for the transaction from the payment device issuer system 111. At block 314, the method 300 may cause a processor of the system 100 to execute instructions stored in a computer memory to release the product to the user.

Returning to block 306, the method 300 may cause a processor to execute instructions stored in a computer memory to determine that the user has selected crypto currency and a crypto currency type (e.g., Bitcoin) to complete the payment transaction with the merchant. Then, at block 316, the method 100 may cause a processor to execute instructions stored in a computer memory to send a validation request. In some embodiments, the validation request is sent by the merchant computer system 106 and/or its acquirer and the payment network system 108 to a validation network corresponding to the particular crypto currency indicated by the wallet module 150D of the user computer system 104. Then, at block 318, the method 100 may cause a processor to execute instructions stored in a computer memory to determine the crypto currency amount of the transaction. In some embodiments, the payment network system 108 may include instructions to determine a crypto currency amount for the transaction according to market values for the particular crypto currency specified by the user computer system 104 at block 306.

At block 320, the method 300 may cause a processor to execute instructions stored in a computer memory to run or compare user and/or merchant crypto currency rules against the transaction of the product purchase request. For example, a rules module 112B of the intermediary system 110 may include instructions to evaluate user and merchant rules from the user profile data 122A corresponding to the user computer system 104 that requested the transaction to determine if the transaction can proceed. The instructions to evaluate the rules may include comparing the rules against crypto currency laws and other regulations for the relevant locations (the user computer system region and/or the merchant computer system region) of the transaction.

With reference to FIGS. 5A, 5B, 5C, and 5D, the interface module 112D of the intermediary system 110 may include a graphical user interface to allow users, merchants and other partners of the payment network system 108 to view cryptocurrency transactions and edit rules governing those transactions such as KYC, AML, CFT, and others. A dashboard interface 500 (FIG. 5A) may display transaction data 122A and/or validation data 124A for each client/customer/merchant, etc., using the system 100. In some embodiments, the dashboard interface may include a number of transactions over time 502, a statistical measure of the types of cryptocurrencies used 504, a value of the transactions 506, and a number of transactions 508. A first rules interface 525 (FIG. 5B) and a second rules interface 550 (FIG. 5C) may provide rulesets 528 and 552 for corresponding regions 530 and 554. In some embodiments, the method 300 may cause a processor to execute instructions stored in a computer memory to set a local and international transaction limit, set KYC details including name, passport number, fingerprint registration, countries allowed for cryptocurrency transactions, etc. In further embodiments, the method 300 may cause a processor to execute instructions stored in a computer memory to set participating banks 532 and 556, respectively. A transactions interface 575 (FIG. 5D) may show a transaction history 578 including sources and destinations for different cryptocurrency transactions as well as other transaction data.

Returning to FIG. 3, at block 322, if the transaction passed the rules from block 320, the method 300 may proceed to block 324 and check the wallet module 150D of the user computer system 104 to ensure that the wallet includes funds to proceed with the transaction. For example, at block 326, the method 300 may cause a processor to execute instructions stored in a computer memory to determine if the wallet module 150D and a wallet account corresponding to the module 150D includes an amount equal to or greater than a purchase amount for the subject of the transaction between the user computer system 104 and the merchant computer system 106.

At block 328, if the wallet module 150D includes an amount equal to or greater than a purchase amount for the subject of the transaction between the user computer system 104 and the merchant computer system 106, the method 300 may cause a processor to execute instructions stored in a computer memory to transfer the funds from the wallet module 150D to the intermediate cryptocurrency wallet module 112A of the intermediary system 110 that is remote from both the user computer system 104 and the merchant computer system 106. In some embodiments, the method 300 may also cause a processor to execute instructions stored in a computer memory (e.g., the intermediate cryptocurrency wallet module 112A) to convert the funds that were transferred to the intermediate cryptocurrency wallet module 112A to the type of funds that are accepted by the merchant computer system 106. Since the merchant computer system 106 accepts fiat currency, as indicated by the instructions executed in relation to block 304, the intermediate cryptocurrency wallet module 112A may convert the funds to fiat currency.

At block 330, upon transferring the funds from the wallet module 150D to the intermediate cryptocurrency wallet module 112A of the intermediary system 110 and converting the funds to be acceptable to the merchant computer system 106, the method 300 may cause a processor to execute instructions stored in a computer memory to transfer the funds from the intermediary system 110 to the merchant computer system 106. A processor may execute the instructions of block 330 asynchronously with other blocks of the method 300 (e.g., block 328, etc.) or immediately after the instructions of block 326. In some embodiments, the method 300 may cause a processor to execute instructions stored in a computer memory to send an approved validation response confirming the transfer in response to the validation request of block 316. The approved validation response may be received at the payment network system 108, the merchant computer system 106, the merchant's acquirer, and other elements of the system 100. The approved validation response may include the funds from the intermediate cryptocurrency wallet module 112A of the intermediary system 110. After the funds are received at the merchant computer system 106, the method 300 may cause a processor to execute instructions stored in a computer memory to release the product at block 314.

Figure 4:
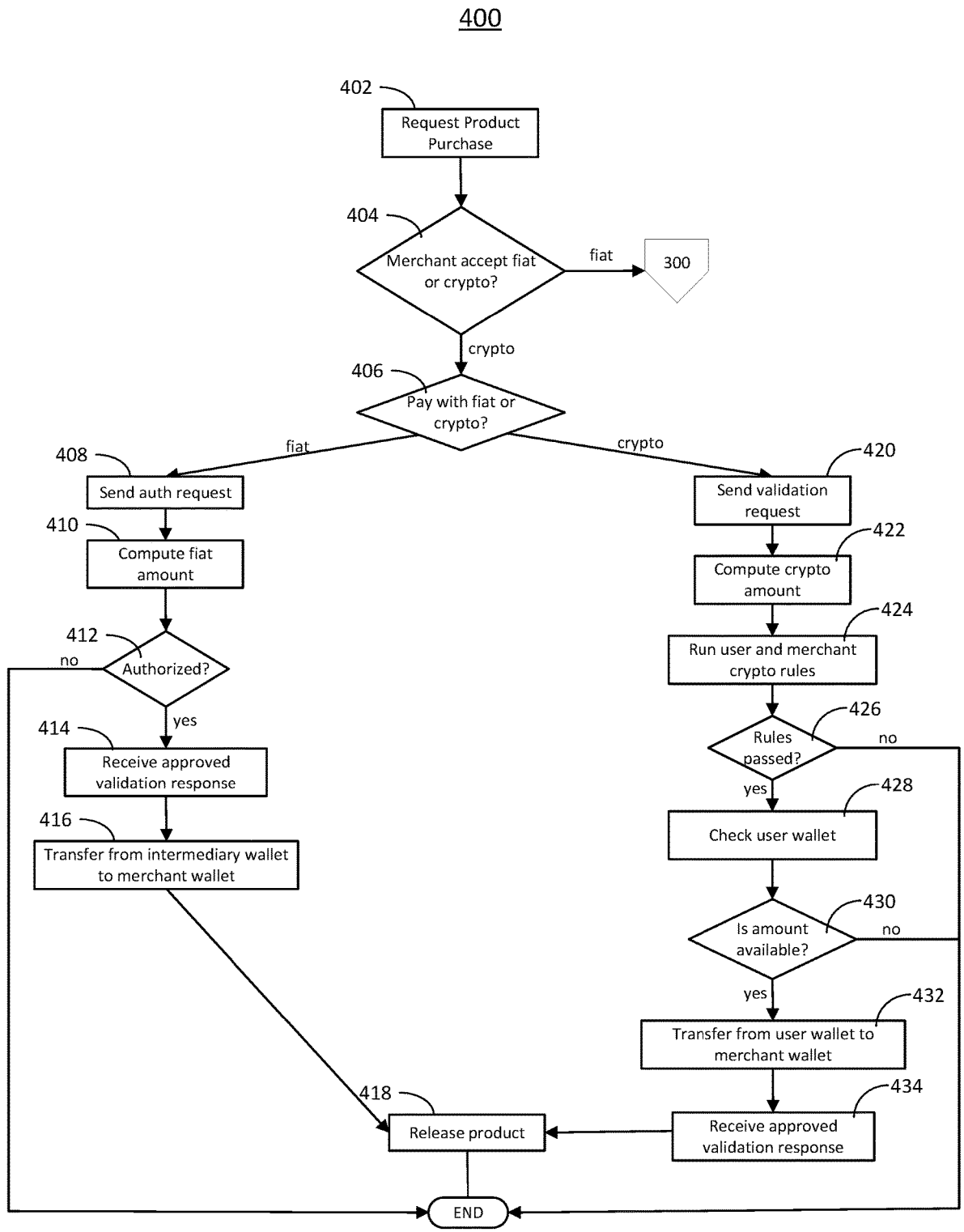
FIG. 4 is a flowchart of a method for integrating cryptocurrency in the Four Party Model when the merchant accepts fiat currency.

FIG. 4 is a flowchart of a method 400 for integrating cryptocurrency in the Four Party Model when the merchant accepts cryptocurrency and the user has a choice to pay with either fiat or crypto currency via the system 100. Each step of the method 400 may be performed on a server or other computing device which may be physically configured to execute the different aspects of the method. Each step of the method 400 is one or more computer-executable instructions (e.g., modules, blocks, stand-alone instructions, etc.) performed on a processor (e.g., 114, 130, 145, 158, 172, 902, etc.) of a server or other computing device (e.g., a system 100, a user computer system 104, a merchant computer system 106, a payment network system 108, an intermediary system 110, a payment device issuer system 111, or other computer system) which may be physically configured to execute the different aspects of the method. Each step may include execution of any of the instructions as described in relation to the systems or other component that is internal or external to the systems. While the below blocks are presented as an ordered set, the various steps described may be executed in any particular order to complete the methods described herein.

At block 402, the system 100 may cause a processor to execute instructions stored in a computer memory to receive a product purchase request. In some embodiments, the product purchase request may be sent by the user computer system 104 generally or the communication module 150C in particular to the merchant computer system 106 and the transaction communication module 134 in particular.

At block 404, the system 100 may cause a processor to execute instructions stored in a computer memory to determine whether the merchant computer system 106 accepts fiat or crypto currency. If crypto currency, the method 400 may proceed to block 406 and the system 100 may cause a processor to execute instructions stored in a computer memory to determine a currency selection from the product purchase request.

If, at block 406, the method 400 determines that the user has selected fiat currency to complete the payment transaction with the merchant, then, at block 408, the method 400 may cause a processor to execute instructions stored in a computer memory to send an authorization request. In some embodiments, the user computer system may cause a processor to execute instructions stored in a computer memory to send the authorization request to one or more of the merchant 106, the payment network system 108, an acquirer of the merchant computer system 106 (e.g., a computing system of bank or financial institution that processes payments on behalf of the merchant computer system 106), etc.

At block 410, the method 400 may cause a processor to execute instructions stored in a computer memory to determine an amount of fiat currency that will satisfy the crypto currency transaction accepted by the merchant. In some embodiments, the payment network module 162 of the payment network system 108 includes instructions that, upon execution, may cause a processor to convert the crypto amount for the transaction into a fiat currency amount. For example, the payment network module 162 may include further instructions that, when executed by a processor, reference an online market price in the fiat currency for the type of crypto currency indicated by the merchant for the transaction. The method may then use that crypto currency price to determine an amount of fiat currency that is equal to the amount of crypto currency indicated by the merchant for the transaction.

At block 412, the method 400 may cause a processor to execute instructions stored in a computer memory to determine whether the transaction is authorized by the payment device issuer system 111. In some embodiments, the payment device issuer module 176 may receive instructions to determine if cardholder account data 180A for the user of the user computer system 104 indicates that the user is authorized to settle the transaction indicated by the product purchase request of block 302. If the user computer system 104 is not authorized for the transaction, then the method 400 may end. If the user computer system 104 is authorized for the transaction, at block 414, one or more entities of the system 100 (e.g., the merchant computer system 106, the payment network system 108, etc.) may receive an approved authorization response indicating that the merchant has received payment for the transaction from the payment device issuer system 111.

At block 416, the method 400 may cause a processor to execute instructions stored in a computer memory to initiate funds transfers between the payment device issuer computer system 111, the merchant computer system 106, and the intermediary system 110 to settle the transaction. In some embodiments, block 416 may cause a processor to execute instructions stored in a computer memory to transfer a settlement amount of the user's fiat currency to the intermediate crypto currency wallet module 112A and then to the merchant computer system 106. In further embodiments, upon transfer of the fiat currency funds to the intermediate cryptocurrency wallet module module 112A, the module 112A may cause a processor of the system 100 to execute instructions to convert the fiat currency funds to crypto currency for the merchant computer system 106. In still further embodiments, the module 112A may cause a processor to execute instructions stored in a computer memory to transfer the crypto currency funds from the intermediate cryptocurrency wallet module 112A to the merchant computer system 104. At block 418, the method 400 may cause a processor of the system 100 to execute instructions stored in a computer memory to release the product to the user. A processor may execute the instructions of block 418 asynchronously with other blocks of the method 400 (e.g., block 416, etc.).

Returning to block 406, the method 400 may cause a processor to execute instructions stored in a computer memory to determine that the user has selected crypto currency and a crypto currency type (e.g., Bitcoin) to complete the payment transaction with the merchant. Then, at block 420, the method 400 may cause a processor to execute instructions stored in a computer memory to send a validation request. In some embodiments, the validation request is sent by the merchant computer system 106 and/or its acquirer and the payment network system 108. Then, at block 422, the method 400 may cause a processor to execute instructions stored in a computer memory to determine the crypto currency amount of the transaction. In some embodiments, the payment network system 108 may include instructions to determine a crypto currency amount for the transaction according to market values for the particular crypto currency specified by the user computer system 104 at block 406.

At block 424, the method 400 may cause a processor to execute instructions stored in a computer memory to run user and/or merchant crypto currency rules against the transaction of the product purchase request, as described above in relation to FIG. 3 and block 320. For example, a rules module 112B of the intermediary system 110 may include instructions to evaluate user and merchant rules from the user profile data 122A corresponding to the user computer system 104 that requested the transaction to determine if the transaction can proceed. The instructions to evaluate the rules may include comparing the rules against laws and other regulations for the relevant regions (customer location and/or merchant location) of the transaction.

Figure 5A:
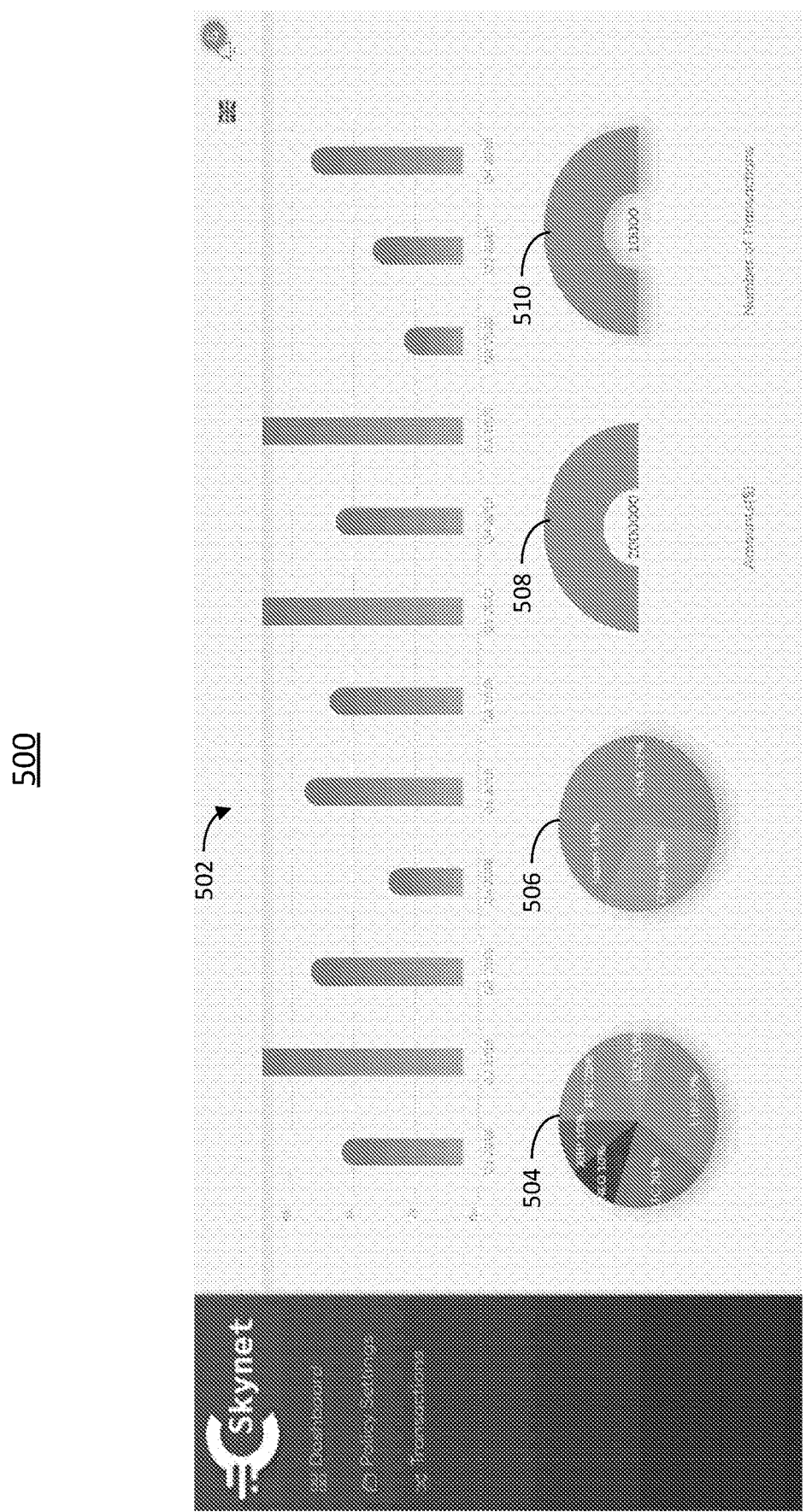
FIG. 5A shows a view of a graphical user interface of a dashboard for the intermediary system.
Figure 5B:
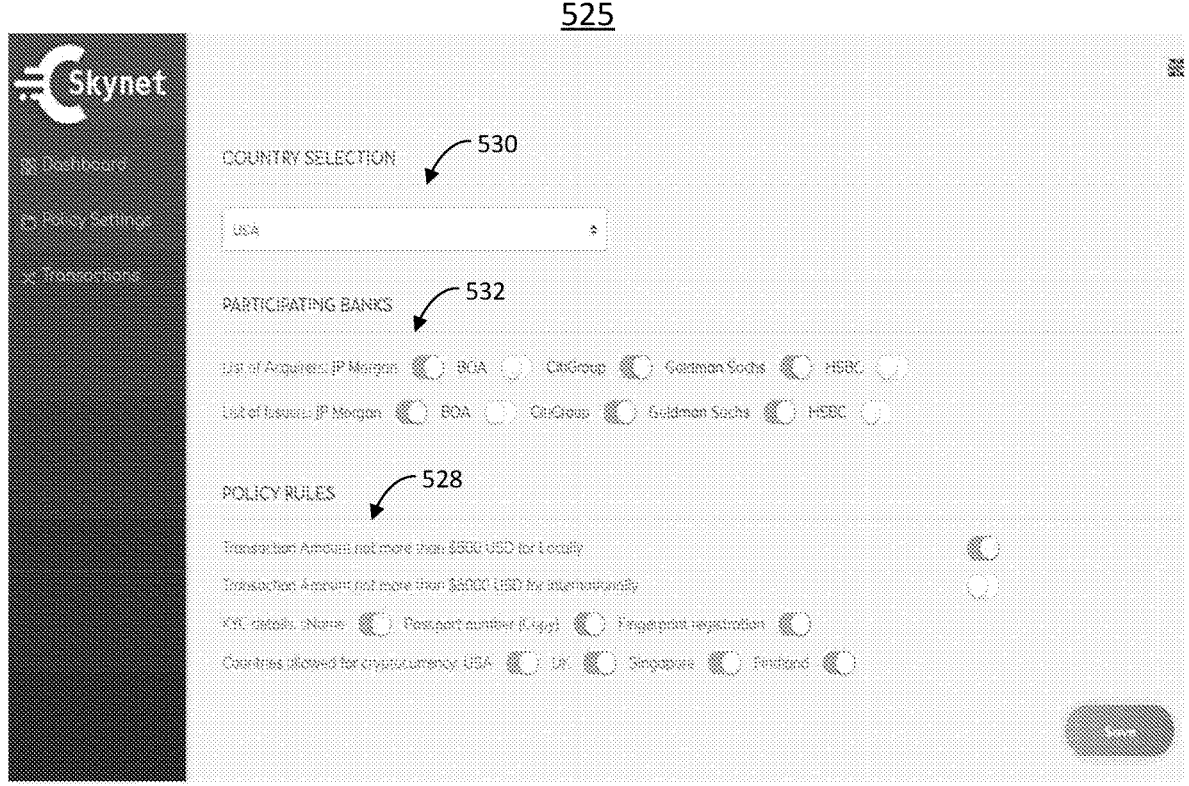
FIGS. 5B and 5C show views of a graphical user interface for intermediary administrators to view and edit parameters and "know your customer" for different regions' cryptocurrency rules.
Figure 5C:
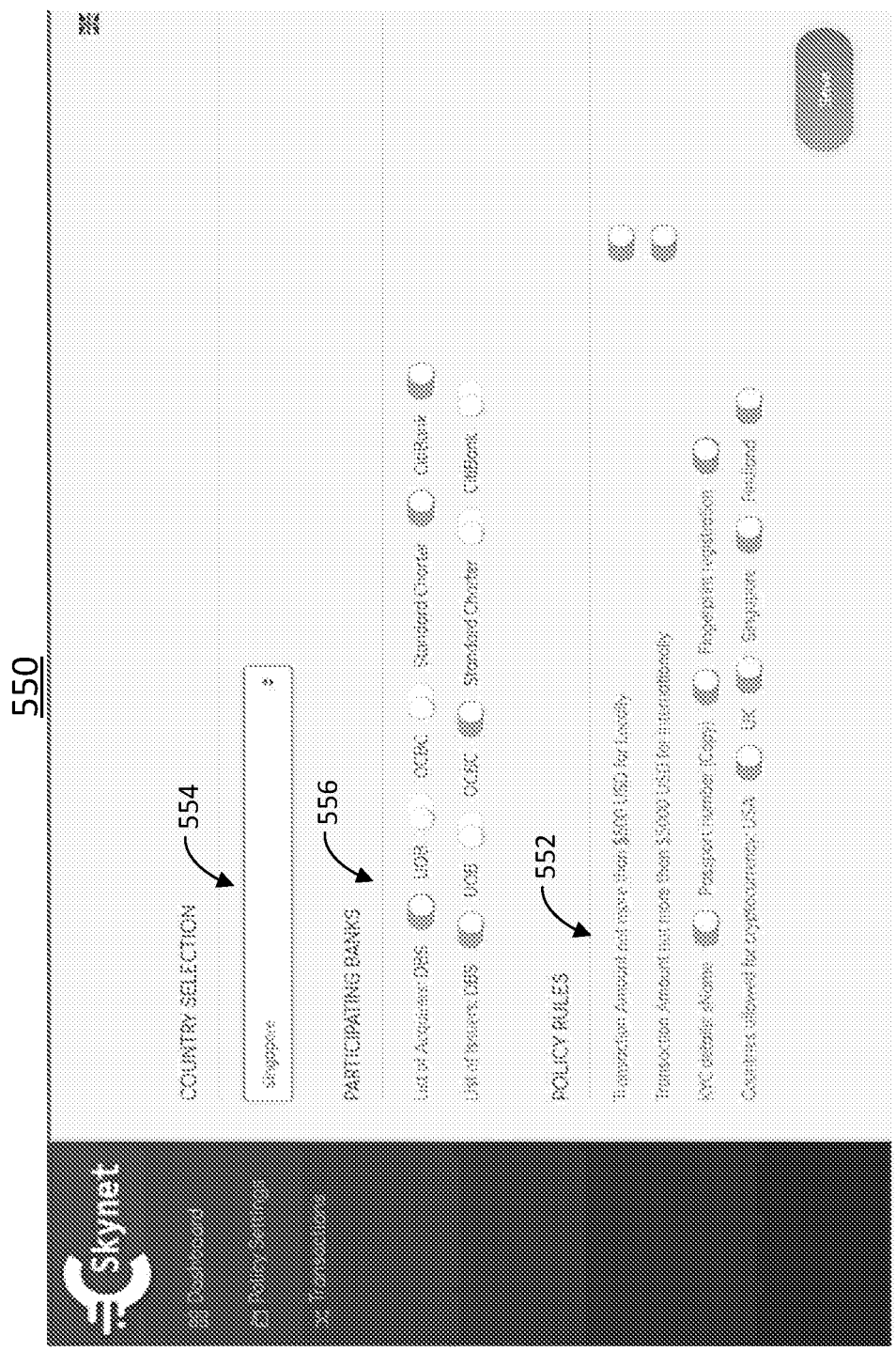
Figure 5D:
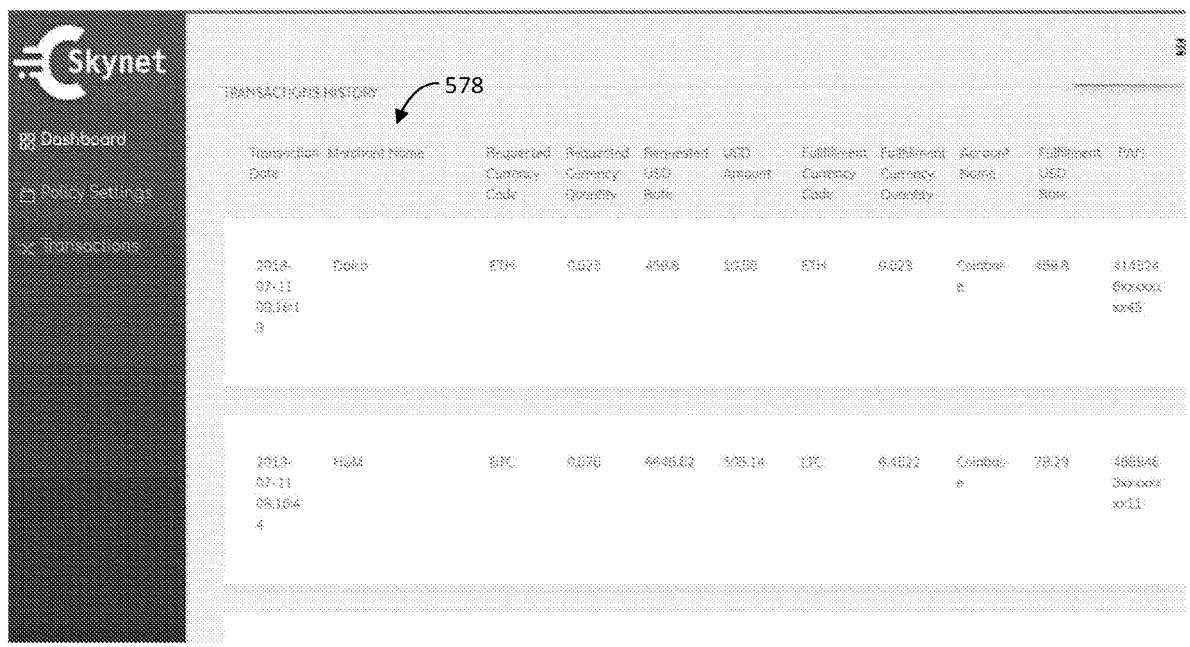
FIG. 5D shows a view of a transactions interface for the intermediary system.

With reference to FIGS. 5B and 5C, the first rules interface 525 (FIG. 5B) and the second rules interface 550 (FIG. 5C) may provide rulesets 528 and 552 for corresponding regions 530 and 554. In some embodiments, block 424 may cause a processor to execute instructions stored in a computer memory to set a local and international transaction limit, set KYC details including name, passport number, fingerprint registration, countries allowed for cryptocurrency transactions, etc. In further embodiments, the method 400 may cause a processor to execute instructions stored in a computer memory to set participating banks 532 and 556, respectively.

Returning to FIG. 4, at block 426, if the transaction passed the rules from block 424, the method 400 may proceed to block 428 and check the wallet module 150D of the user computer system 104 to ensure that the wallet includes funds to proceed with the transaction. For example, at block 428, the method 400 may cause a processor to execute instructions stored in a computer memory to determine if the wallet module 150D and a wallet account corresponding to the module 150D includes an amount equal to or greater than a purchase amount for the subject of the transaction between the user computer system 104 and the merchant computer system 106.

At block 430, if the wallet module 150D includes an amount equal to or greater than a purchase amount for the subject of the transaction between the user computer system 104 and the merchant computer system 106, at block 432, the method 400 may cause a processor to execute instructions stored in a computer memory to transfer the crypto currency funds from the wallet module 150D to the merchant computer system 106. In some embodiments, the method 300 may also cause a processor to execute instructions stored in a computer memory (e.g., the intermediate cryptocurrency wallet module 112A) to convert the crypto currency funds of one type (e.g., Bitcoin) that were transferred to the intermediate cryptocurrency wallet module 112A to a second type of crypto currency funds (e.g., Ethereum) that are accepted by the merchant computer system 106.

At block 434, upon transferring the funds from the wallet module 150D to the intermediate cryptocurrency wallet module 112A of the intermediary system 110 and, if needed, converting the funds to be acceptable to the merchant computer system 106, the method 400 may cause a processor to execute instructions stored in a computer memory to send an approved validation response confirming the transfer in response to the validation request of block 420. A processor may execute the instructions of block 434 asynchronously with other blocks of the method 400 (e.g., block 432, etc.). The approved validation response may be received at the payment network system 108, the merchant computer system 106, the merchant's acquirer, the merchant computer system 106, and other elements of the system 100. In some embodiments, approved validation response may include the funds from the intermediate cryptocurrency wallet module 112A of the intermediary system 110. After the funds are received at the merchant computer system 106, at block 418, the method 400 may cause a processor to execute instructions stored in a computer memory to release the product at block 418.

Thus, the disclosure provides a technical solution to the technical problem of facilitating the use of cryptocurrencies within the Four Party Model between a merchant and a consumer who may use or accept fiat and/or cryptocurrency. As described herein, an intermediary wallet entity may assume the risk of cryptocurrency transactions. For example, a fiat-fiat transaction may follow the usual settlement process of the Four Party Model. In a crypto-crypto transaction, settlement may occur in real time. But in a fiat merchant/crypto customer transaction, settlement may be made from the customer's crypto wallet to an intermediary wallet. Fiat settlement may then occur between the intermediary and merchant following the Four Party Model. In a crypto merchant/fiat customer transaction, a transfer may be made from the intermediary wallet to the merchant's crypto wallet. Fiat settlement between the customer's bank (issuer) and intermediary may then happen in the usual settlement process.

Figure 6:
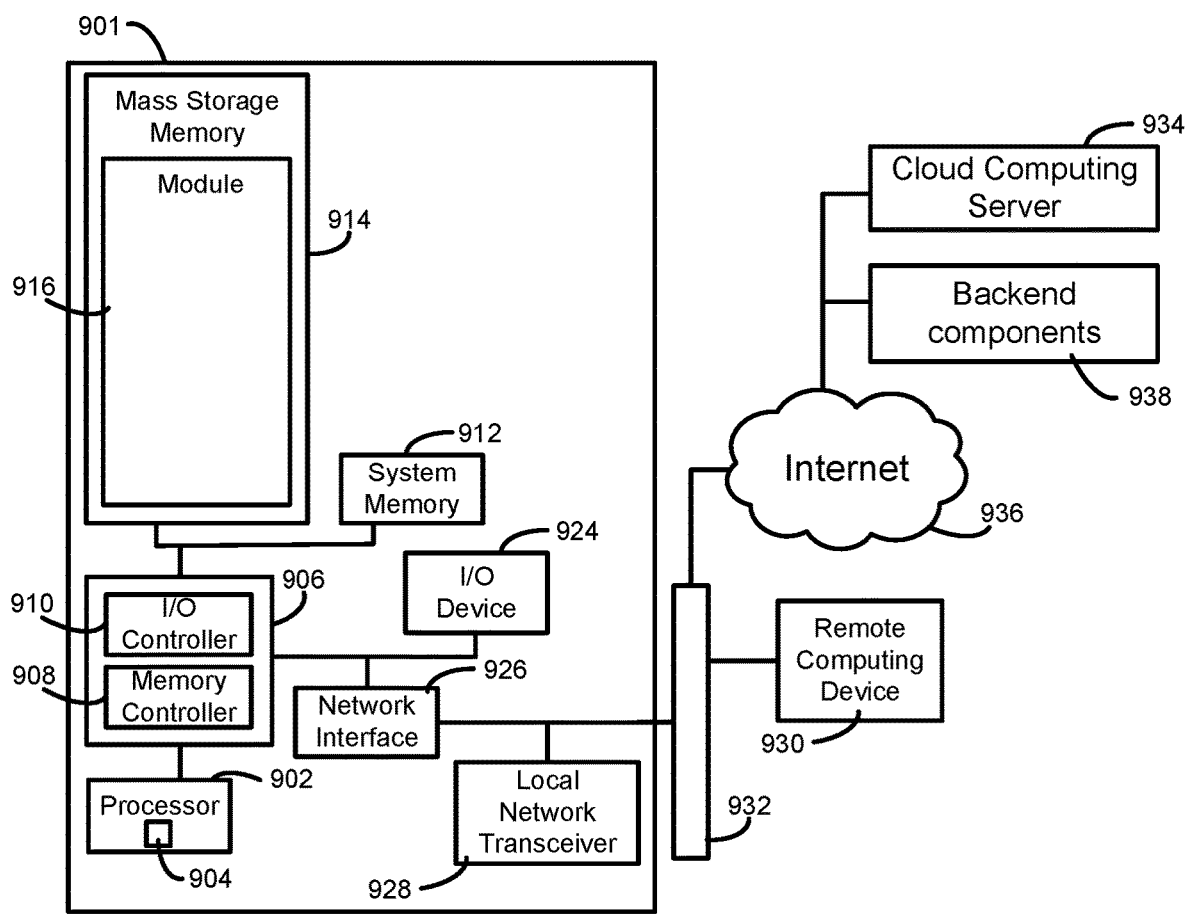
FIG. 6 shows an exemplary computing device that may be physically configured to execute the methods and include the various components described herein.

FIG. 6 is a high-level block diagram of an example computing environment 900 for the system 100 and methods (e.g., methods 300 and 400) as described herein. The computing device 900 may include a server (e.g., the payment server 156, merchant server 129, payment server 156, intermediary server 116, mobile computing device (e.g., user computing system 104), a cellular phone, a tablet computer, a Wi-Fi-enabled device or other personal computing device capable of wireless or wired communication), a thin client, or other known type of computing device.

Logically, the various servers may be designed and built to specifically execute certain tasks. For example, the payment server 156 may receive a large amount of data in a short period of time meaning the payment server may contain a special, high speed input output circuit to handle the large amount of data. Similarly, the intermediary server 116 may execute processor intensive validation procedures and thus the intermediary server 116 may have increased processing power that is specially adapted to quickly execute the validation algorithms. In yet another example, the merchant server 129 may be under less computing strain than the intermediary server 116 and may have less processing power.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for settling a transaction, the method comprising:
   receiving a transaction request between a user computer system and a merchant computer system, wherein the transaction request indicates a first currency for the user computer system and a second currency for the merchant computer system, the first currency being a crypto currency and the second currency being one of a fiat currency or the crypto currency;
   transcribing the transaction request into a record of an intermediate cryptocurrency wallet module;
   sending a validation request to a plurality of peer-to-peer computing devices of a validation network for the crypto currency based on node information for each of the plurality of peer-to-peer computing devices of the validation network, the validation request including at least a portion of the node information for the plurality of peer-to-peer computing devices of the validation network to validate the transaction at one or more of the plurality of peer-to-peer computing devices of the validation network;

graphically presenting, in response to receiving validation data via the intermediate cryptocurrency wallet module, the transaction request, a first ruleset, and a second ruleset;
receiving, from the user computer system, the first ruleset comprising at least rules of a first geographical region;
receiving, from the merchant computer system, the second ruleset comprising at least rules of a second geographical region;
computing a settlement amount for the transaction based on market value of the crypto currency;
comparing the first ruleset to first cryptocurrency regulations for the first region;
comparing the second ruleset to second cryptocurrency regulations for the second region; and
in response to the first ruleset matching the first cryptocurrency regulations for the first region, the second ruleset matching the second cryptocurrency regulations for the second region, and the second currency being the fiat currency:
transferring the settlement amount of the crypto currency from the user computer system to an intermediate cryptocurrency wallet module;
converting the settlement amount of the crypto currency to a settlement amount of the fiat currency and
transferring the settlement amount of the fiat currency from the intermediate cryptocurrency wallet module to the merchant computer system; or
in response to the first ruleset matching the first cryptocurrency regulations for the first region, the second ruleset matching the second cryptocurrency regulations corresponding to the second region, and the second currency being the crypto currency:
transferring the settlement amount to the merchant computer system.

2. The method of claim 1, wherein the intermediate cryptocurrency wallet module is remote from both the user computer system and the merchant computer system.

3. The method of claim 1, wherein the first ruleset and the second ruleset include at least one of a set of Know Your Client (KYC) rules, a set of Anti-Money Laundering (AML) rules, or a set of Combating the Financing of Terrorism (CFT) rules.

4. The method of claim 1, further comprising releasing a product indicated by the transaction to the user computer system.

5. The method of claim 1, further comprising referencing an online market price for the crypto currency to determine the settlement amount.

6. The method of claim 1, comprising receiving the validation data for the validation request from the validation network.

7. The method of claim 1, further comprising determining whether a user has a value greater than the settlement amount.

8. The method of claim 1, further comprising:
comparing the first ruleset to the second ruleset for the crypto currency indicated by the transaction request; and
determining the first ruleset matches the second ruleset for the crypto currency.

9. The method of claim 1, wherein a value of the settlement amount of the fiat currency and a value of the settlement amount of the crypto currency are substantially equal.

10. A system for settling a transaction when selectively using fiat currency or crypto currency, the system comprising:

a processor; and
a memory storing instructions that, when executed by the processor:
receiving a transaction request between a user computer system and a merchant computer system, wherein the transaction request indicates a first currency for the user computer system and a second currency for the merchant computer system, the first currency being a crypto currency and the second currency being one of a fiat currency or the crypto currency;
transcribing the transaction request into a record of an intermediate cryptocurrency wallet module;
sending a validation request to a plurality of peer-to-peer computing devices of a validation network for the crypto currency based on node information for each of the plurality of peer-to-peer computing devices of the validation network, the validation request including at least a portion of the node information for the plurality of peer-to-peer computing devices of the validation network to validate the transaction at one or more of the plurality of peer-to-peer computing devices of the validation network;
graphically presenting, in response to receiving validation data via the intermediate cryptocurrency wallet module, the transaction request, a first ruleset, and a second ruleset;
receiving, from the user computer system, the first ruleset comprising at least rules of a first geographical region;
receiving, from the merchant computer system, the second ruleset comprising at least rules of a second geographical region;
computing a settlement amount for the transaction based on market value of the crypto currency;
comparing the first ruleset to first cryptocurrency regulations for the first region;
comparing the second ruleset to second cryptocurrency regulations for the second region; and
in response to the first ruleset matching the first cryptocurrency regulations for the first region, the second ruleset matching the second cryptocurrency regulations for the second region, and the second currency being the fiat currency:
transferring the settlement amount of the crypto currency from the user computer system to an intermediate cryptocurrency wallet module;
converting the settlement amount of the crypto currency to a settlement amount of the fiat currency and
transferring the settlement amount of the fiat currency from the intermediate cryptocurrency wallet module to the merchant computer system; or
in response to the first ruleset matching the first cryptocurrency regulations for the first region, the second ruleset matching the second cryptocurrency regulations corresponding to the second region, and the second currency being the crypto currency:
transferring the settlement amount to the merchant computer system.

11. The system of claim 10, wherein the intermediate cryptocurrency wallet module is remote from both the user computer system and the merchant computer system.

12. The system of claim 10, wherein the transaction indicates the first region and the second region.

13. The system of claim 10, wherein the first ruleset and the second ruleset include at least one of a set of Know Your Client (KYC) rules, a set of Anti-Money Laundering (AML) rules, or a set of Combating the Financing of Terrorism (CFT) rules.

14. The system of claim 10, wherein the processor executes further instructions stored in the memory to release a product indicated by the transaction to the user computer system.

15. The system of claim 10, wherein the processor executes further instructions stored in the memory to reference an online market price for the crypto currency to determine the settlement amount.

16. The system of claim 10, wherein a value of the settlement amount of the first currency and a value of the settlement amount of the second currency are substantially equal.

* * * * *